(12) United States Patent
Yang et al.

(10) Patent No.: US 11,172,387 B2
(45) Date of Patent: Nov. 9, 2021

(54) METHOD AND DEVICE FOR POSITIONING ABNORMAL COVERAGE OF RADIO CELL

(71) Applicant: XI'AN ZHONGXING NEW SOFTWARE CO., LTD., Shaanxi (CN)

(72) Inventors: Weiwei Yang, Guangdong (CN); Yuan Feng, Guangdong (CN); Xiaojun Ma, Guangdong (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 0 days.

(21) Appl. No.: 16/619,765

(22) PCT Filed: Jun. 4, 2018

(86) PCT No.: PCT/CN2018/089816
§ 371 (c)(1),
(2) Date: Dec. 5, 2019

(87) PCT Pub. No.: WO2018/223930
PCT Pub. Date: Dec. 13, 2018

(65) Prior Publication Data
US 2020/0107205 A1  Apr. 2, 2020

(30) Foreign Application Priority Data
Jun. 5, 2017 (CN) .......................... 201710414639.8

(51) Int. Cl.
*H04W 36/00* (2009.01)
*H04W 24/04* (2009.01)
(Continued)

(52) U.S. Cl.
CPC ....... *H04W 24/04* (2013.01); *H04W 36/0022* (2013.01); *H04W 36/0083* (2013.01);
(Continued)

(58) Field of Classification Search
None
See application file for complete search history.

(56) References Cited

U.S. PATENT DOCUMENTS 10,531,365 B2 * 1/2020 Kaur ...................... H04W 24/04
2004/0242158 A1 * 12/2004 Fattouch ............... H04W 16/18
455/63.1

(Continued)

FOREIGN PATENT DOCUMENTS

CN 101778438 A 7/2010
CN 101977417 A 2/2011
(Continued)

OTHER PUBLICATIONS

Huafeng Tian et al, "Research on MOS Quality Quick Warning Based on Network Management Index", Information & Communications, Issue 6, 2016.

(Continued)

*Primary Examiner* — Jinsong Hu
*Assistant Examiner* — Alexander J Yi
(74) *Attorney, Agent, or Firm* — Bond Schoeneck & King, PLLC; George McGuire

(57) ABSTRACT

In a method and a device for positioning an abnormal coverage of a radio cell provided by the present disclosure, voice quality MOSs before and after a radio cell handover are acquired, if a reduction amplitude of the voice quality MOS after the radio cell handover with respect to that before the radio cell handover exceeds a preset threshold value, the radio cell handover is abnormal, and then if an intermediate radio cell exists to make an included angle, which is formed by a connection path from the intermediate radio cell to a radio cell after the radio cell handover and a handover path from a radio cell before the radio cell handover to the radio cell after the radio cell handover, smaller than or equal to a (Continued)

preset angle, the radio cell after the radio cell handover is positioned as an abnormally covered radio cell.

12 Claims, 4 Drawing Sheets

(51) Int. Cl.
    *H04W 36/30*     (2009.01)
    *H04W 64/00*     (2009.01)

(52) U.S. Cl.
    CPC ......... *H04W 36/30* (2013.01); *H04W 64/003* (2013.01); *H04W 64/006* (2013.01)

(56) References Cited

U.S. PATENT DOCUMENTS

| | | | | |
|---|---|---|---|---|
| 2006/0052112 | A1* | 3/2006 | Baussi | G01S 5/0072 |
| | | | | 455/456.1 |
| 2010/0074249 | A1* | 3/2010 | Boucadair | H04L 65/1046 |
| | | | | 370/352 |
| 2015/0092744 | A1* | 4/2015 | Singh | H04L 47/29 |
| | | | | 370/331 |
| 2016/0142959 | A1 | 5/2016 | Wang et al. | |
| 2017/0118707 | A1* | 4/2017 | Bharadwaj | H04W 52/028 |

FOREIGN PATENT DOCUMENTS

| | | | |
|---|---|---|---|
| CN | 102075988 | A | 5/2011 |
| CN | 103581976 | * | 2/2014 |
| CN | 103581976 | A | 2/2014 |
| CN | 103856996 | A | 6/2014 |
| CN | 104394551 | A | 3/2015 |
| CN | 105744543 | A | 7/2016 |

OTHER PUBLICATIONS

WIPO, International Search Report dated Jul. 13, 2018.
Translated Chinese First Search Report, dated Feb. 20, 2021, pp. 1-2.
Translated Chinese First Office Action, dated Mar. 1, 2021, pp. 1-7.

* cited by examiner

METHOD AND DEVICE FOR POSITIONING ABNORMAL COVERAGE OF RADIO CELL

CROSS-REFERENCE TO RELATED APPLICATIONS

This is a National Phase Application filed under 35 U.S.C. 371 as a national stage of PCT/CN2018/089816, filed on Jun. 4, 2018, an application claiming the priority of Chinese Patent Application No. 201710414639.8, filed on Jun. 5, 2017, the contents of which are incorporated herein in their entirety by reference.

TECHNICAL FIELD

The present disclosure relates to the field of communications, and in particular to a method and a device for positioning an abnormal coverage of a radio cell.

BACKGROUND

With rapid development of modern communication technologies, requirements for radio coverage are increasingly becoming extremely stringent. In addition to the radio coverage in cities and rooms, radio coverage is also required in barren mountains and wildwoods, and a wider and wider radio coverage range is achieved, so that a requirement on quality of radio signals to be provided is higher and higher.

Voice over Long Term Evolution (VoLTE) is a data transmission technology based on Internet Protocol (IP), which does not need 2G or 3G network, all services are carried on 4G network, data services and voice services may be unified in a same network, that is a voice service based on IP Multimedia Subsystem (IMS). IMS has been defined as a multimedia service core network supporting all IP access networks, which can support any kind (mobile or fixed, wired or radio) of IP-connectivity access network (IP CAN), meaning that access of traditional 2G network or 3G network is supported. IMS has become a core network standard architecture in all-IP era due to the support of multiple accesses and rich multimedia services. IMS is now a mainstream choice in the fixed voice field, and is also determined as a standard architecture for mobile voice by the 3rd Generation Partnership Project (3GPP) and Global System for Mobile Communications assembly (GSMA). The 4G network can provide high-rate data services and high-quality audio and video calls, and the latter is realized by the VoLTE technology. A radio communication network consisting of VoLTE technology is a VoLTE network.

In a radio communication network, a radio cell (also referred to as a cellular cell) refers to an area covered by a base station or a part (sector antenna) of a base station in a cellular mobile radio system, and a mobile station can be reliably wirelessly connected to the base station through a radio channel in this area.

In a radio network, there is a case of abnormal coverage of a radio cell, and the abnormal coverage includes scenarios such as over coverage, weak coverage, antenna feeder connection error, and the like. The over coverage refers to an overlapping of coverage in the network, and an over coverage phenomenon is represented by signaling congestion, call drop caused by interference and frequent switching of traffic channels (TCH). The over coverage may cause a density of base stations to be too high, thereby causing co-channel interference. The weak coverage means that an area required to be covered by the base station is large, a distance between the base stations is too large, or a signal at a boundary area is weak due to an obstruction of a building. The weak coverage directly affects a call quality and must be paid attention to The antenna feeder connection error is that there is a connection error between a carrier frequency jumper of a base transceiver station (BTS) and a feeder of an antenna feeder, which results in different of actual connections from planning. The antenna feeder connection error may cause interference in the network, imbalance between uplink and downlink, and thus call drop and assignment failure may be resulted in, thereby causing serious influence on a network quality.

In order to ensure good radio service, it is necessary to discover and process the abnormal coverage of the radio cell in time, and in conventional technologies, the abnormal coverage of the radio cell is generally discovered and processed in a manual road test manner.

SUMMARY

An embodiment of the present disclosure provides a method for positioning an abnormal coverage of a radio cell, including: acquiring call flow signaling data and call handoff flow signaling data of a voice call; associating the call flow signaling data with the call handoff flow signaling data, and acquiring voice quality MOSs (Mean Opinion Scores) of the voice call before and after a radio cell handover; determining whether a reduction amplitude of the voice quality MOS of the voice call after the radio cell handover with respect to the voice quality MOS of the voice call before the radio cell handover exceeds a preset threshold value, and in response to that the reduction amplitude exceeds the preset threshold value, the radio cell handover of the voice call is abnormal; in response to that the radio cell handover of the voice call is abnormal, determining whether an intermediate radio cell exists to make an included angle, which is formed by a connection path and a handover path, smaller than or equal to a preset angle, wherein the connection path is a path from the intermediate radio cell to a first radio cell, the handover path is a path from a second radio cell to the first radio cell, the first radio cell is a radio cell in which the voice call is located after the radio cell handover, and the second radio cell is a radio cell in which the voice call is located before the radio cell handover; and in response to that the intermediate radio cell exists, positioning the first radio cell as an abnormally covered radio cell.

An embodiment of the present disclosure further provides a device for positioning an abnormal coverage of a radio cell, including: a signaling data acquiring member configured to acquire call flow signaling data and call handoff flow signaling data of a voice call; a voice quality MOS acquiring member configured to associate the call flow signaling data with the call handoff flow signaling data and acquire voice quality MOSs of the voice call before and after a radio cell handover; an abnormal radio cell handover determination member configured to determine whether a reduction amplitude of the voice quality MOS of the voice call after the radio cell handover with respect to the voice quality MOS of the voice call before the radio cell handover exceeds a preset threshold value, and in response to that the reduction amplitude exceeds the preset threshold value, the radio cell handover of the voice call is abnormal; and an abnormal coverage determination member configured to position a first radio cell as an abnormally covered radio cell, in response to that the radio cell handover is abnormal, and an intermediate radio cell exists to make an included angle, which is formed by a connection path and a handover path, smaller than or equal to a preset angle, wherein the connection path is a path from the intermediate radio cell to the first radio cell, the handover path is a path from a second radio cell to the first radio cell, the first radio cell is a radio cell in which the voice call is located after the radio cell handover, and the second radio cell is a radio cell in which the voice call is located before the radio cell handover.

An embodiment of the present disclosure further provides a non-volatile computer-readable storage medium, storing computer-executable instructions which, executed by a processor, cause the processor to perform the method for positioning the abnormal coverage of the radio cell provided by the embodiment of the present disclosure.

An embodiment of the present disclosure further provides a computer device, including a memory, a processor, and a computer program stored on the memory and executable on the processor, and the processor executes the method for positioning the abnormal coverage of the radio cell provided by the embodiment of the present disclosure by executing the computer program.

DESCRIPTION OF EMBODIMENTS

In order to make technical solutions and advantages of the present disclosure more apparent, the technical solutions of the present disclosure are further described in detail below with reference to accompanying drawings and embodiments. It should be understood that the specific embodiments described herein are merely for purposes of explaining the technical solutions of the present disclosure and are not intended to limit the technical solutions of the present disclosure.

In an operator communication system, radio devices are generally from a plurality of manufacturers, interfaces of the radio devices are inconsistent, and it is difficult to report data according to a same interface standard by all manufacturers, and thus in the conventional technology, it is difficult to realize a whole network monitoring for a radio coverage of a VoLTE network, and a very high maintenance and labor cost for the radio network may be resulted in by discovering the abnormal coverage of the radio cell in a manual road test manner.

In view of above, an embodiment of the present disclosure provides a method for positioning an abnormal coverage of a radio cell, for discovering the abnormal coverage of the radio cell in time, and further evaluating the radio coverage in the whole of the VoLTE network, thereby a narrowed radio network optimization range is provided and the maintenance cost of the radio network is reduced. The technical solution of the embodiment of the present disclosure is described in detail below.

Figure 1:
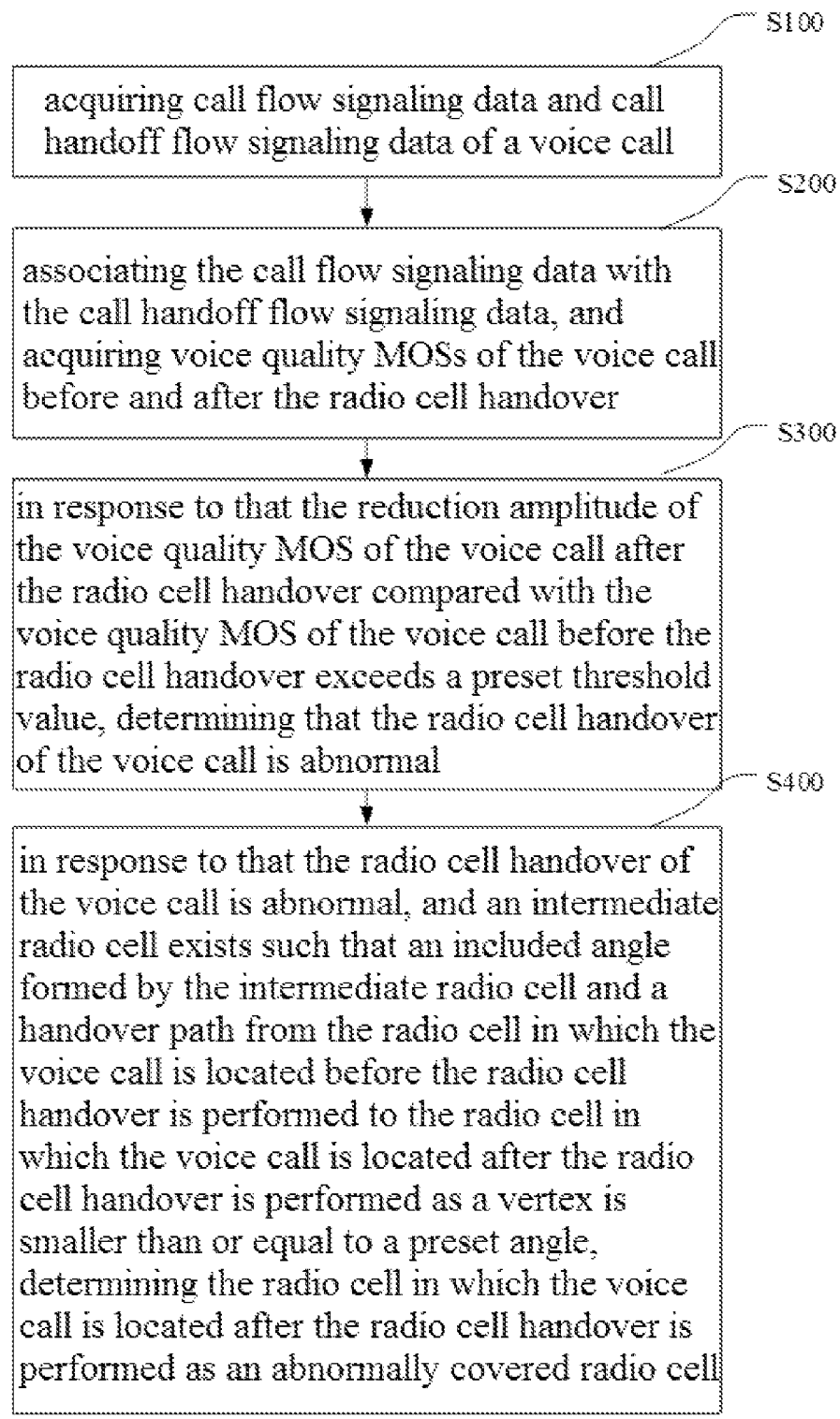
FIG. 1 is a flowchart of a method for positioning an abnormal coverage of a radio cell according to an embodiment of the present disclosure.

FIG. 1 is a flowchart of a method for positioning an abnormal coverage of a radio cell according to an embodiment of the present disclosure, and as shown in FIG. 1, the method includes following steps S100 to S400.

At S100, call flow signaling data and call handoff flow signaling data of a voice call are acquired.

Figure 2:
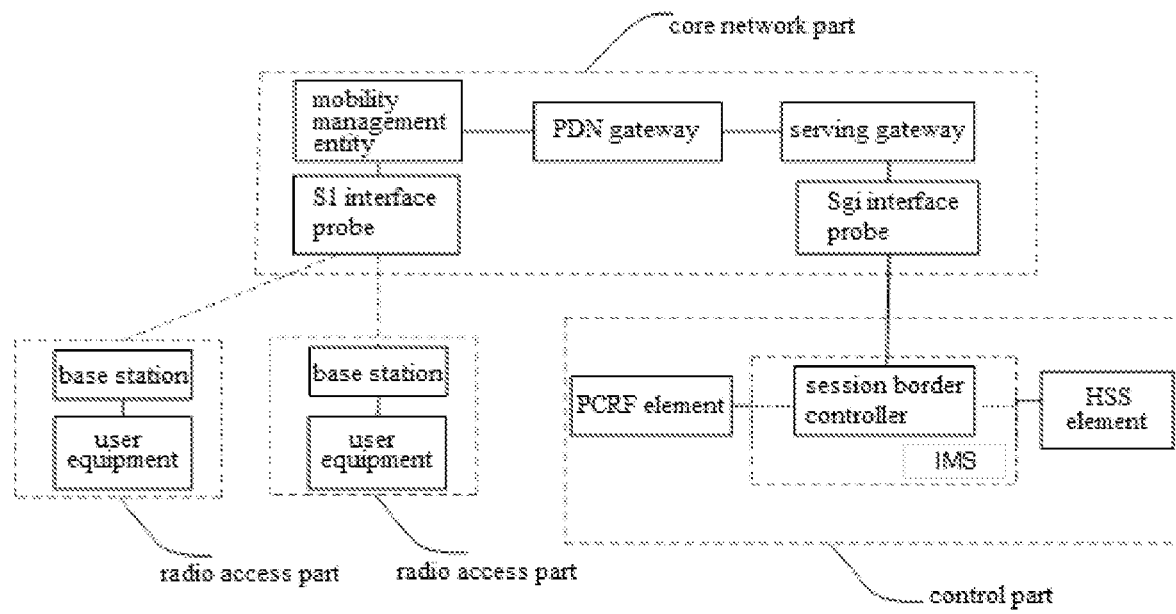
FIG. 2 is a block diagram of an application scenario of a method for positioning an abnormal coverage of a radio cell according to an embodiment of the present disclosure.

Specifically, call flow signaling data and call handoff flow signaling data of a voice call, which are collected in a core network part of a VoLTE network, are acquired, and signaling data in the voice call is collected by deploying a signaling data collection device (such as a probe) in the core network part of the VoLTE network. FIG. 2 is a block diagram of an application scenario of a method for positioning an abnormal coverage of a radio cell according to an embodiment of the present disclosure. As shown in FIG. 2, the VoLTE network includes a plurality of network entities, and in brief, the VoLTE network may be divided into three parts, i.e., a base station subsystem (BSS), a network subsystem (NSS), and a system support part configured to implement functions such as security management. For convenience of description, in the embodiment of the present disclosure, the VoLTE network is divided into three main parts including: a radio access part belonging to the base station subsystem; a core network part belonging to the network subsystem; and a control part belonging to the system support section.

The radio access part mainly includes user equipment (i.e., terminals) and a base station (Evolved Node B, eNodeB). Compared with a base station (NodeB) in a 3G network, the eNodeB integrates a portion of functions of a radio network controller (RNC), including functions of a physical layer, such as hybrid automatic repeat request (HARQ), media access control (MAC), scheduling, radio access control, mobility management, and the like. The architecture of the eNodeB is divided into a physical access layer, a MAC layer, a radio link control (RLC) protocol layer, a packet data convergence protocol (PDCP) layer, and a radio resource control (RRC) layer. The eNodeB communicates with a mobility management entity (MME) through an S1_MME interface for controlling signaling, and communicates with a serving gateway (SGW) through an S1_U interface for user data transmission. The communication between different eNodeBs is performed through an X2 interface, and is mainly used for rapidly realizing user resource management and data migration during handover of a mobile terminal between different eNodeBs. The radio access part may deploy more than one base station, and may also deploy a plurality of base stations to form a plurality of radio cells, for example, two base stations, as an example, are deployed in FIG. 2.

The core network part belongs to the network subsystem, and is mainly used for continuing a call request or data request from an interface A (i.e., a communication interface between the network subsystem and the base station subsystem) to different networks, and mainly used as an interface provided by a bearer network to an external network, for providing a user connection, a user management and a service bearing.

The core network part mainly includes three functional entities, i.e., mobility management entity (MME), serving gateway (SGW), and packet data network gateway (PGW). The MME is evolved by an entity of a serving GPRS support node (SGSN) in a general packet radio service (GPRS) network, and mainly provides a portion of core control functions of an evolved packet core (EPC). The MME is a key control node of a LTE network, and is responsible for tracking and paging control of user equipment in an idle mode, including registration and logout procedures of the user equipment, and simultaneously helps a user to select different SGWs to complete core network node handover in the LTE network. Through communication with a home subscriber server (HSS), the MME performs an authentication function of the mobile user in the EPC part, and is also responsible for data exchange in user plane when a user terminal moves between eNodeBs and between the LTE network and any other 3GPP network. The SGW provides a control function in user plane, and is mainly responsible for processes in user plane, routing and forwarding of data packets, and supports a function of mobility handover of user data by the terminal. The PGW is mainly responsible for data transmission of the terminal and external packet data networks, and in the VoLTE network, the PGW allocates an IP address of the terminal and provides an access of the EPC part to the IMS part.

The control part mainly includes three parts, i.e., a policy and charging rules function (PCRF) element, a home subscriber server (HSS) and an IMS part. The PCRF element is mainly responsible for charging and a session media based policy control function. The PCRF element mainly interworks with a proxy-call session control function (P-CSCF) of an IMS access point, and checks and controls allocation of media resources (e.g., media type, IP address, media communication port, etc.) required by an application. The HSS (home subscriber server) is mainly responsible for storing user data and service data. Functions provided by the HSS include an IP multimedia function, a home location register (HLR) function required by a packet switch (PS) domain, an HLR function required by a circuit switch (CS) domain, and an authentication function. The IMS part contains a session border controller. When the user terminal is attached to the LTE network, the EPC part may acquire an authentication vector of the EPC part through the HSS, and the MME completes the authentication of the user terminal in the EPC part. When a user registers in the IMS, a serving-call session control function (S-CSCF) of an IMS server may acquire an authentication vector in the IMS from the HSS again so as to authenticate the user again and ensure the validity of the user. An application server (AS) in the IMS may provide a plurality of services, such as traditional services in a public switched telephone network (PSTN), conferences, color ring tones, color images, etc., and the user service data is also stored in the HSS.

In some implementations, step S100 includes: acquiring call flow signaling data collected between a service gateway and a session border controller; and acquiring call handoff flow signaling data collected between a base station and a mobility management entity of a core network.

The call flow signaling data of the voice call may be collected and acquired in the core network part of the VoLTE network by deploying a voice signaling data acquisition device at the core network part of the VoLTE network. If a handover of the mobile terminal is performed between radio cells during the voice call, the call handoff flow signaling data of the voice call is further acquired.

Specifically, as shown in FIG. 2, an S1 interface probe may be deployed in the core network part of the VoLTE network between the base station and the MME (i.e., mobility management entity) of the core network part of the VoLTE network to collect signaling of the S1 interface at dots and collect call handoff flow signaling data of the voice call. An Sgi interface probe may be deployed between the SGW (i.e., service gateway) of the core network part and the SBC (i.e., session border controller) to collect signaling of the Sgi interface at dots and collect call flow signaling data of the voice call. The number of the probes deployed may be set according to actual requirements, and although FIG. 2 illustrates one S1 interface probe and one Sgi interface probe as an example, it does not mean that only one S1 interface probe and only one Sgi interface probe can be deployed. The S1 interface is a communication interface between an eNodeB (base station) and an EPC (packet core evolution) part of the LTE network. The Sgi interface is used to connect the PGW and the external internet, and is mainly used to establish a tunnel for transferring user plane data.

The following specifically describes procedures of the core network part of the VoLTE network for collecting the call flow signaling data and the call handoff flow signaling data of the voice call.

Figure 3:
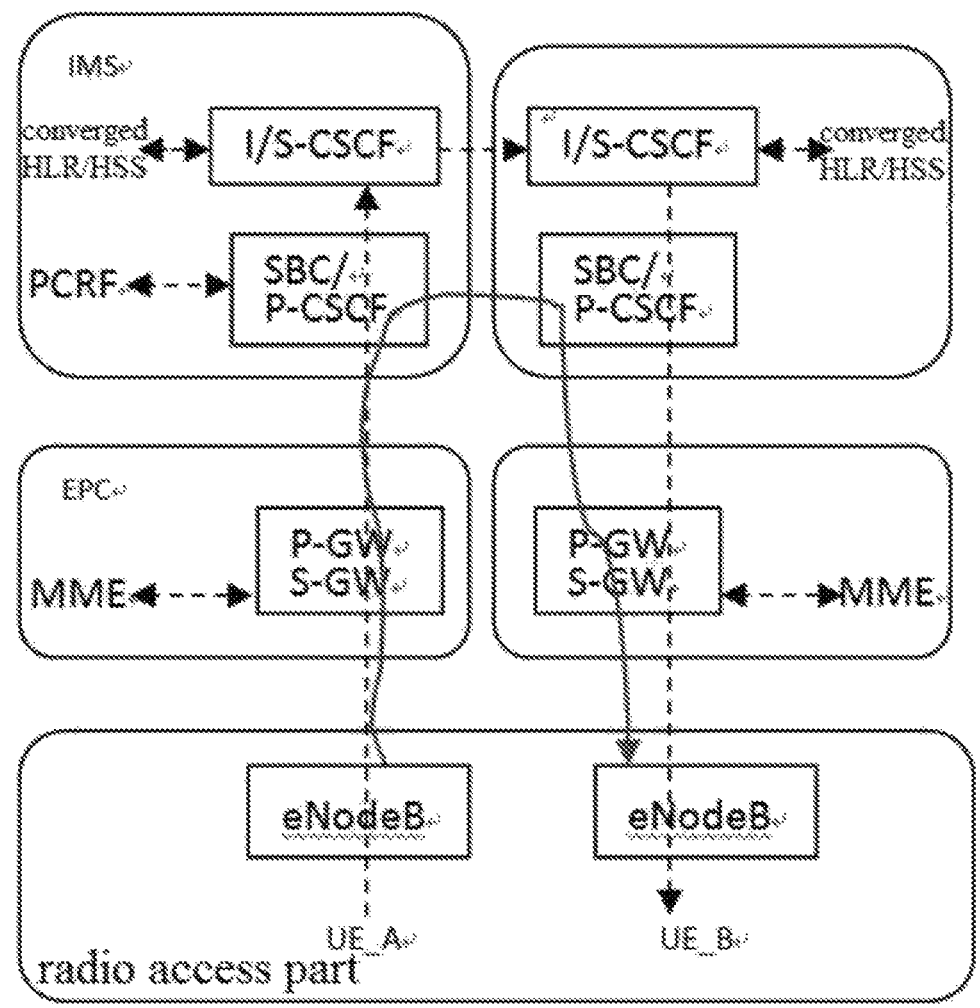
FIG. 3 is a schematic diagram of a VoLTE call flow in a method for positioning an abnormal coverage of a radio cell according to an embodiment of the present disclosure.

FIG. 3 is a schematic diagram of a VoLTE call flow in a method for positioning an abnormal coverage of a radio cell according to an embodiment of the present disclosure. As shown in FIG. 3, the user terminal accesses from the base station, to the SGW, and then to the SBC. During such procedure, the Sgi interface probe is deployed between the SGW and the SBC to collect signaling of the Sgi interface at dots, thereby collecting the call flow signaling data.

The procedure is explained as follows.

a. calling signaling plane flow: after a calling user initiates a call request, a multimedia telephony application server (MMTel AS) performs calling service processing, and a service-call session control function (S-CSCF) at the calling side requests an address of an interrogating-call session control function (I-CSCF) of a called party from a telephone number mapping (ENUM)/domain name system (DNS) according to a called number format.

b. called signaling plane flow: a service centralization and continuity application server (SCC AS) requests called network information from a converged HLR/HSS, the converged HLR/HSS requests the latest location updating information of the user stored locally from the MME, and send an obtained domain selection information to the SCC AS, and the SCC AS indicates the S-CSCF to route the calling to the called user through the P-CSCF after obtaining the latest resident network of the called user.

c. called bearing plane establishing flow: after receiving the call request, the called party replies 183/180 (183/180 is an SIP protocol response status code, 183 indicates session progress, and 180 indicates ringing) response message to the called P-CSCF, the P-CSCF initiates a bearer establishment request to the PCRF, the PCRF provides an authorized quality of service (QoS) policy to the PGW, and the PGW establishes a dedicated bearer of the called user equipment (UE) (terminal) according to the authorized QoS policy.

d. calling bearing plane establishing flow: after receiving the response message replied by the called user, the calling P-CSCF initiates a bearer establishment request to the PCRF, the PCRF provides an authorized QoS policy to the PGW, and the PGW establishes a dedicated bearer of the calling UE according to the authorized QoS policy.

e. on-hook release flow: after the called user receives an on-hook request of the calling user, a called bearer releasing operation is carried out through the PCRF, and after the release is finished, a response message is sent to the calling side, and when the calling side P-CSCF receives the response message, a calling bear releasing operation is carried out through the PCRF.

A signaling plane voice quality mean opinion score (MOS) is calculated according to uplink and downlink jitters, a network delay and a key performance indication (KPI) of packet loss rate reported by the probe, and the calculation of the MOS is shown in ITU-T G107 protocol in detail.

In a word, during the whole procedure, after a calling bearer and a called bearer are established, a probe reports related indexes of voice quality in a slicing mode, including packet loss rate, jitter time delay, network time delay, coding and decoding, and the voice quality MOS of each slice is calculated and obtained according to the ITU-T G107 protocol.

Figure 4:
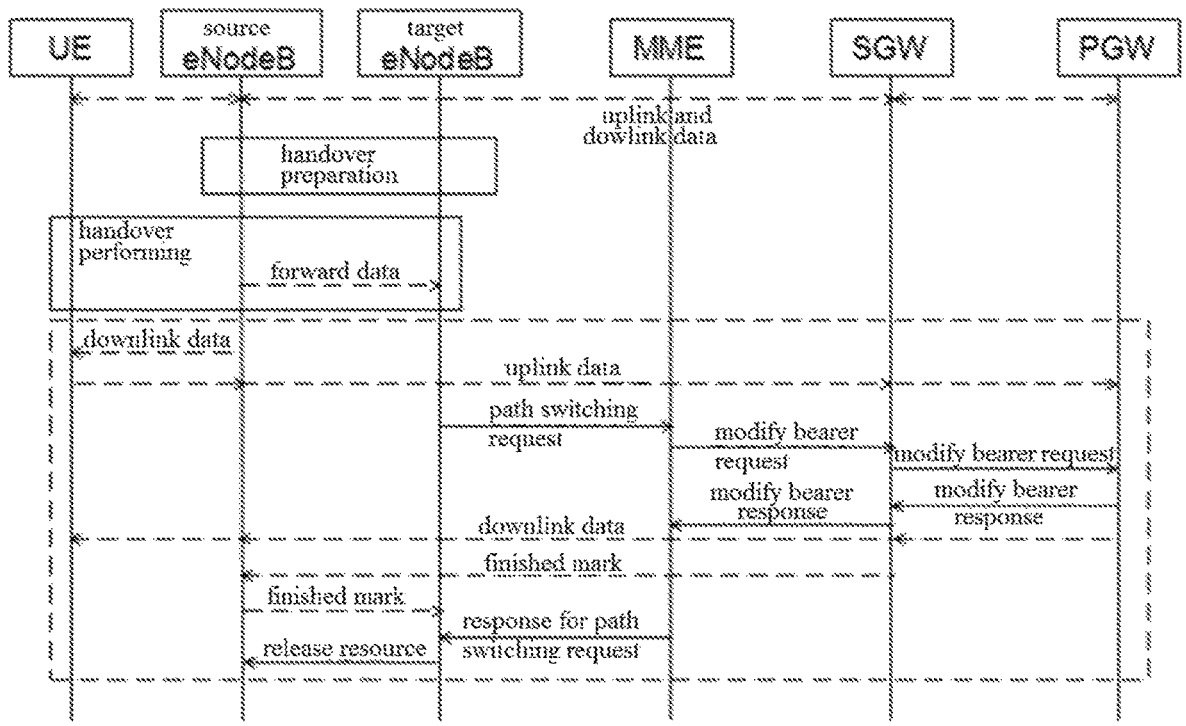
FIG. 4 is a schematic diagram of a procedure of performing a radio cell handover by a radio part of a VoLTE network in a method for positioning an abnormal coverage of a radio cell according to an embodiment of the present disclosure.

FIG. 4 is a schematic diagram of a procedure of performing a radio cell handover by a radio part of a VoLTE network in a method for positioning an abnormal coverage of a radio cell according to an embodiment of the present disclosure. In such procedure, the user terminal accesses the MME from the base station, and an S1 interface probe is deployed between the eNodeB and the MME to acquire signaling of the S1 interface at dots, so as to collect call handoff flow signaling data.

The procedure is explained as follows.

a. a target eNodeB sends a path switch request message to the MME to inform the UE that the cell has been changed, the message including a cell global identity (TAI+ECGI) of the target cell and the handover evolved packet system (EPS) bearer list.

b. the MME sends a modify bearer request message to the SGW for each packet data network (PDN) connection, the message including a base station address (eNodeB address) and an acceptable EPS bearer related downlink user plane tunnel endpoint identifier (TEID).

If the PGW requests user location information, the MME may also include the user location information element in the modify bearer request message.

c. the SGW starts to send a downlink packet to the target eNodeB using the received address and TEID, and returns a modify bearer response message to the MME.

d. the MME responds a path switch request acknowledge message to the target eNodeB, the message including an SGW address (serving GW addresses) and an uplink TEID for user plane.

e. the target eNodeB sends a release resource message to a source eNodeB, notifies the radio cell that the handover is successful, and triggers the resource release.

In such procedure, after identifying S1 handoff (i.e., an action of a user communication transferring from one base station to another base station) or X2 handoff message, the S1 interface probe reports location information and related signaling plane indicators before and after the radio cell handover.

At S200, the call flow signaling data is associated with the call handoff flow signaling data, and voice quality MOSs of the voice call before and after the radio cell handover are acquired.

MOS is a communication term and is an important indicator for measuring the voice quality of a communication system.

Scope and meaning of MOS: score 0 represents the worst quality and score 5 is the highest score. The voice quality MOS of a standard pulse code modulation (PCM) is about 4.4.

MOSs corresponding to common coding formats are as follows: voice quality MOS encoded by G.711 is about 4.8; voice quality MOS encoded by G.721, G.723 and G.72 is about 4.2; voice quality MOS encoded G.728 is about 4.2; voice quality MOS encoded by G.729 is about 4.2; voice quality MOS encoded by G.723.1 (5.3 Kb/s) is about 3.5; voice quality MOS encoded by G.723.1 (6.3 Kb/s) is about 3.98.

Common MOS evaluation methods include subjective MOS evaluation and objective MOS evaluation.

The subjective MOS evaluation adopts ITU-TP.800 and P.830 proposal, different persons respectively carry out subjective feeling comparisons on original corpus and degenerated corpus subjected to system processing, and obtain MOSs respectively, and then a mean score is calculated.

The objective MOS evaluation adopts a method of perceptual evaluation of speech quality (PESQ) provided by ITU-TP.862 recommendation to perform a test by a special instrument (e.g., Agilent's VQT tester) or software.

In the embodiment of the present disclosure, the MOS is calculated according to ITU-T G107 protocol, ITU-T represents ITU telecommunication standardization sector, in series and recommendations of ITU-T, G-series protocol is a protocol on transmission systems and media, digital systems and networks, English version of ITU-T G.107 was approved by ITU-T research group $12^{th}$ on Apr. 29, 2009, mainly relates to E-model (computer model for transmission planning), and a structure and a basic algorithm of E-model.

Specifically, after the S1 interface signaling plane index is obtained, the call flow signaling data and the call handoff flow signaling data are associated, that is, the obtained S1 interface signaling data and the obtained Sgi interface signaling data are associated through an associated key, voice quality MOSs of the voice call before and after the radio cell handover are calculated, and then the obtained MOSs are analyzed.

Since each base station does not necessarily access one call at a certain time, and the call duration of each call may not be consistent, the voice quality MOS needs to be continuously calculated during the whole duration of each call, and especially when each voice call includes multiple radio inter-cell handovers, the association between the S1 interface signaling data and the Sgi interface signaling data may be performed by using an international mobile subscriber identification number (IMSI) and a 5-second time slice parameter as an association key, the voice quality MOSs of each voice call before and after the radio cell handover are continuously calculated according to the ITU-T G107 protocol, and whether an abnormal coverage of radio cell exists when the VoLTE voice is handed over between radio cells is evaluated according to changes in the voice quality MOS.

At S300, determining whether the reduction amplitude of the voice quality MOS of the voice call after the radio cell handover compared with the voice quality MOS of the voice call before the radio cell handover exceeds a preset threshold value, and in response to that the reduction amplitude exceeds the preset threshold value, the radio cell handover of the voice call is abnormal.

The reduction amplitude of the voice quality MOS of the VoLTE voice call after the radio cell handover compared with the voice quality MOS of the VoLTE voice call before the radio cell handover exceeding the preset threshold value represents that the voice quality MOS of the VoLTE voice call after the radio cell handover is degraded, and thus it is determined that the radio cell handover of the VoLTE voice call is abnormal.

Whether the abnormal coverage of radio cell exists when the VoLTE voice is handed over between radio cells is determined according to the changes in the voice quality MOSs of the VoLTE voice call before and after the radio cell handover. Specifically, the voice quality MOS of the VoLTE voice call after the radio cell handover being reduced compared to the voice quality MOS of the VoLTE voice call before the radio cell handover means that the voice quality of the voice call is reduced, it indicates that the radio signal coverage of the radio cell in which the voice call is located after the radio cell handover is performed is worse than that of the radio cell in which the voice call is located before the radio cell handover is performed. When the reduction amplitude of the voice quality MOS of the voice call after the radio cell handover compared with the voice quality MOS of the voice call before the radio cell handover exceeds a certain amplitude, such as a preset threshold value (preset MOS), which means that the radio signal coverage of the radio cell in which the voice call is located after the radio cell handover is performed is obviously worse than that of the radio cell in which the voice call is located before the radio cell handover is performed, and the abnormal coverage of radio cell exists when the VoLTE voice call is handed over between the radio cells, the radio cell handover of the VoLTE voice call being abnormal is determined, and when the reduction amplitude of the voice quality MOS of the voice call after the radio cell handover compared with the voice quality MOS of the voice call before the radio cell handover does not exceed a certain amplitude, such as the preset threshold value (preset MOS), the changes in the voice quality MOSs can be considered to be in a normal range, and the radio cell handover of the VoLTE voice call being not abnormal is determined.

At S400, in response to that the radio cell handover of the voice call is abnormal, and an intermediate radio cell exists to make an included angle, which is formed by a connection path and a handover path, smaller than or equal to a preset angle, positioning the radio cell in which the voice call is located after the radio cell handover as an abnormally covered radio cell, wherein the connection path is a path from the intermediate radio cell to the radio cell in which the voice call is located after the radio cell handover, the handover path is a path from the radio cell in which the voice call is located before the radio cell handover to the radio cell in which the voice call is located after the radio cell handover.

By taking the radio cell in which the voice call is located after the radio cell handover is performed abnormally as an analysis object, and in response to that the intermediate radio cell exists to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, the radio cell in which the voice call is located after the radio cell handover is positioned as an abnormally covered radio cell, and the preset angle may be set by technicians according to different scenes and experiences, for example, the preset angle may be set as 15°.

By analyzing and counting the MOSs calculated in step S300, according to the reduction amplitude of the voice quality MOS of the voice call after the radio cell handover compared with the voice quality MOS of the voice call before the radio cell handover, the voice call of which the voice quality MOS after the radio cell handover is reduced compared with the voice quality MOS before the radio cell handover is identified as the voice call with the abnormal radio cell handover, the radio cell in which the voice call is located after the radio cell handover is performed abnormally is recorded, and thus a cell list related to the abnormal radio cell handover is obtained, radio cells in the cell list are all radio cells in which the voice call is located after the radio cell handover is performed abnormally.

For convenience of determination, in some implementations, the radio cells in the cell list may be arranged in a descending order of the number of times relating to the abnormal radio cell handover, and the more the number of times relating to the abnormal radio cell handover, the greater the probability of abnormal coverage of the radio cell in which the voice call is located after the radio cell handover is performed.

By taking the radio cells in the cell list as analysis objects, if a certain radio cell is only occasionally related to the abnormal radio cell handover, due to many reasons causing the abnormal radio cell handover, such as that the terminal equipment may be located at a place where the signal is blocked or shielded, therefore, the radio cell occasionally relating to the abnormal radio cell handover does not indicate that the radio cell in which the voice call is located after the radio cell handover is performed is necessarily covered abnormally, however, if the VoLTE voice is handed over from different radio cells to a same radio cell, and more than one abnormal radio cell handovers occur, the probability of abnormal coverage of the radio cell in which the voice call is located after the radio cell handover is performed is higher, in such case, the radio cell in which the voice call is located after the radio cell handover is performed is taken as the analysis object, and radio cells peripheral to the radio cell in which the voice call is located after the radio cell handover is performed are taken as auxiliary analysis objects, according to handover paths, for example, in the order of the handover paths from long to short, it is determined whether or not the intermediate radio cell exists to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset (fixed) angle θ.

In the embodiment of the present disclosure, the handover path from the radio cell in which the voice call is located before the radio cell handover to the radio cell in which the voice call is located after the radio cell handover refers to a path along which the voice call is handed over between two radio cells, for example, when the voice call is handed over from the radio cell B to the radio cell A, the connection from the radio cell B to the radio cell A is a handover path from the radio cell B to the radio cell A. If the abnormal radio cell handover occurs when the voice call is handed over from the radio cell B to radio cell A, the handover path from the radio cell B to radio cell A is referred to as an abnormal handover path.

In the embodiment of the present disclosure, the radio cells, peripheral to the radio cell (i.e., the analysis object to be analyzed) in which the voice call is located after the radio cell handover is performed, include radio cells with which the radio cell handover has occurred or not occurred relating to the radio cell in which the voice call is located after the radio cell handover is performed and theoretically, any other radio cell belonging to a same VoLTE network as the radio cell to be analyzed may be the radio cell peripheral to the radio cell to be analyzed. In practices, for other radio cells with which the radio cell handover has not occurred relating to the radio cell to be analyzed, usually, based on a reference table of deployment of base stations of the VoLTE network and distances between locations of the other radio cells and the radio cell to be analyzed, a portion of the other radio cells are selected as the auxiliary analysis objects, for example, according to the handover path, a radio cell, that is closer to the radio cell in which the voice call is located before the radio cell handover is performed or the radio cell in which the voice call is located after the radio cell handover is performed, is selected as the auxiliary analysis object. The reference table of deployment of base stations is a reference table for deploying the base stations, includes location information of each base station, and the location information is indicated by longitude and latitude. The distance between the base stations can be determined according to the location information indicated by longitudes and latitudes of the base stations.

If the intermediate radio cell exists to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, the radio cell in which the voice call is located after the radio cell handover is positioned as an abnormally covered radio cell, because if the intermediate radio cell exists, under normal conditions, in order to ensure good communication quality, the radio cell handover of the VoLTE voice call should use the intermediate radio cell as a middle bridge to realize the radio cell handover of the VoLTE voice call, and if the radio cell handover is directly performed by skipping the intermediate radio cell (i.e., skipping the middle bridge), and the voice quality MOS of the voice call after the radio cell handover is reduced (i.e., the voice quality of the voice call is reduced), it can be determined that the radio cell in which the voice call is located after the radio cell handover is performed is an abnormally covered radio cell. If there is no intermediate radio cell to make the included angle, which is formed by the connection path and the handover path, smaller than or equal to the preset angle, the abnormal radio cell handover is not necessarily caused by the abnormal coverage of the radio cell.

The embodiment of the present disclosure collects the signaling of the S1 interface and the Sgi interface by deploying probes in the core network part, and after associating the signaling of the S1 interface with the signaling of the Sgi interface, the voice quality MOSs of the voice call before and after the radio cell handover are calculated respectively, reliable data support is provided, a problem that it is difficult to monitoring the abnormal radio cell coverage in a whole network, which is caused by great delays of reporting data of base stations, large amount of data and the fact that it is difficult to report data by a plurality of manufacturers according to a same interface standard, is solved, compared with the fact that the abnormal radio cell coverage is found manually, it is more convenient to uniformly monitor the abnormal coverage of the radio cell in the whole VoLTE network at a lower cost, an accurate positioning is provided for radio network optimizations of operators, a narrowed radio network optimization range and an improved are achieved, and the network maintenance cost is reduced.

In some implementations, step S400 includes: within a preset duration, in response to that the number of times of abnormal radio cell handover occurring exceeds a preset threshold value when voice calls are handed over to a same radio cell and further the intermediate radio cell exists to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, the radio cell in which the voice calls are located after the radio cell handovers is positioned as the abnormally covered radio cell.

That is, within the preset duration, in response to that the number of times of abnormal radio cell handover occurring exceeds the preset threshold value when radio cell handovers are performed on voice calls from different radio cells to the same radio cell, it is necessary to further determine whether the coverage of the radio cell in which the voice calls are located after the radio cell handovers are performed is abnormal, for example, in the order of handover paths, which are from the radio cells in which the voice calls are located before the radio cell handovers are performed to the radio cell in which the voice calls are located after the radio cell handovers are performed, from long to short, other radio cells peripheral to the radio cell in which the voice calls are located after the radio cell handovers are performed are selected from the reference table of deployment of base stations, and in response to that the intermediate radio cell exists to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, that is, the intermediate radio cell exists in the handover path and is capable of being handed over to, but the intermediate radio cell (i.e., the middle bridge) is skipped over, and the voice quality MOS of the voice call after the radio cell handover is reduced, i.e., the voice quality of the voice call is lowered, thus the radio cell in which the voice calls are located after the radio cell handovers is positioned as the abnormally covered radio cell.

For example, it may be determined whether the number of times of abnormal radio cell handover occurring exceeds the preset threshold value when the same radio cell is handed over to within one week, two weeks, or one month. The preset threshold value may be set appropriately according to an environment in which the base station is located, for example, for an urban downtown area in which the radio cell handover is frequently performed for the VoLTE voice call, the preset threshold value may be set five times a week, and for another example, for a barren mountain forest in which the frequency of the radio cell handover for the VoLTE voice call is relatively small, the preset threshold value may be set five times a month.

In the embodiment of the present disclosure, a cell list related to the abnormal radio cell handover is obtained by recording the radio cells, related to the abnormal radio cell handover, in which the voice calls are located after the radio cell handovers are performed, the radio cells in the cell list are arranged according to a descending order of the times related to the abnormal radio cell handover, and the radio cells which are abnormally covered in the preset duration in the whole VoLTE network can be counted according to the preset threshold value set for the times of the abnormal radio cell handover occurring in the preset duration, thus an unified monitoring for the radio cells in the whole network is realized, and compared with the traditional technology that the radio cells in the whole network are maintained in the manual road test mode, the efficiency of discovery and maintenance for the abnormal coverage radio cell is greatly improved, and the maintenance cost is reduced.

In some implementations, step S400 includes: within a preset duration, in response to that the number of times of abnormal radio cell handover occurring exceeds a preset threshold value when voice calls are handed over to a same radio cell, determining the radio cell, in which the voice calls are located after being handed over, as a high frequency abnormal handover radio cell; forming an abnormal handover set by the radio cells from which the voice calls are handed over to the high frequency abnormal handover radio cell in the preset duration, and acquiring a length of a handover path from each radio cell in the abnormal handover set to the high frequency abnormal handover radio cell; and, according to the order of handover paths from long to short, detecting whether the intermediate radio cell exists to make an included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, and in response to that the intermediate radio cell exists, positioning the high frequency abnormal handover radio cell as an abnormally covered radio cell.

By determining whether or not the intermediate radio cell exists, in the order of the handover paths from long to short, to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, an efficiency of positioning is greatly improved, because, for a longer handover path, normally, in order to ensure the communication quality, the intermediate radio cell, which is capable of being handed over to, should be used as the middle bridge to realize the radio cell handover of the voice call, and if the intermediate radio cell that can be used as the middle bridge exists in a longer handover path, but the intermediate radio cell is not used as the middle bridge when the voice call is handed over, the radio cell in which the voice call is located after the radio cell handover can be directly positioned as the abnormally covered radio cell, and on the contrary, if it is determined whether the intermediate radio cell exists, in the order of the handover paths from short to long, to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to a preset angle, and in response to that there is no intermediate radio cell available as an middle bridge in the short handover path, it cannot be determined that the radio cell in which the voice call is located after the radio cell handover is performed is not the abnormally covered radio cell, and further determination and positioning are required.

In some implementations, the method for positioning the abnormal coverage of the radio cell further includes: after step S400, the radio cells determined to be abnormally covered are uniformly displayed, and information to be displayed includes at least one of a radio cell identifier, a base station equipment model, times related to the abnormal radio cell handover, location information (longitude and latitude) of a base station and an azimuth angle.

By uniformly displaying abnormally covered radio cells determined by the core network part of the VoLTE network, and displaying information including at least one of the radio cell identifier, the base station equipment model, the times related to the abnormal radio cell handover, the location information (longitude and latitude) of the base station and the azimuth angle, data acquisition can be performed through the core network part, an identification of abnormal coverage of the radio cell in the whole network is realized, and maintenance personnel can conveniently perform maintenance according to the displayed information.

Figure 5:
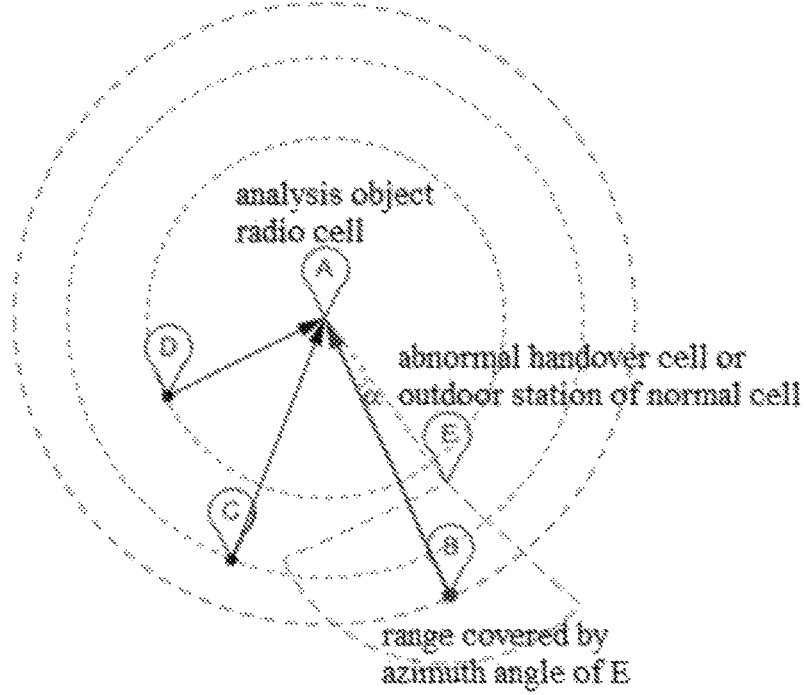
FIG. 5 is a schematic diagram of determining an abnormal coverage of a radio cell by using a method for positioning an abnormal coverage of a radio cell according to an embodiment of the present disclosure.

The following shows a procedure of how to determine abnormal coverage of a radio cell by a specific example, and referring to FIG. 5, the procedure of determining abnormal coverage of a radio cell includes following steps S401 to S404.

At step S401, a high frequency abnormal handover radio cell is detected as an abnormal coverage analysis object.

Specifically, in a preset duration, in response to that the number of times of abnormal radio cell handover occurring exceeds a preset threshold value when the voice call is handed over from different radio cells to a same radio cell, the radio cell in which the voice call is located after the radio cell handover is performed is determined to be a high frequency abnormal handover radio cell, for example, if the same radio cell relates to five times abnormal radio cell handovers within one week, the radio cell is determined to be a high frequency abnormal handover radio cell, and then it is further determined whether the radio cell is an abnormally covered radio cell.

In the example, assuming that the abnormal radio cell handover has occurred when the voice call is handed over from any of radio cells B, C and D to the radio cell A within a preset duration, and the number of times that the radio cell A is associated with the abnormal radio cell handover exceeds a preset threshold value, for example, the radio cell A is associated with ten times of abnormal radio cell handover within one week, it is determined that the radio cell A is a high frequency abnormal handover radio cell, and the radio cells B, C and D may be referred to as abnormal handover radio cells, and thus, it is further determined whether the radio cell A is an abnormally covered radio cell by taking the radio cell A as an abnormal coverage analysis object.

At step S402, distances between the radio cell A and the abnormal handover radio cells B, C, and D are calculated respectively from location information (longitude and latitude) of base stations of the radio cells.

All the radio cells from which the voice call is handed over to the high frequency abnormal handover radio cell A constitute an abnormal handover set, which is {B, C, D} in this example.

Typically, each radio cell has a unique cell identity and location, and the location of the radio cell is identified by longitude and latitude. The distance between the radio cell A and the abnormal handover radio cell is expressed by the following formula:

$dis_A = |CI_A - CI_{abcover}|_{(long, lat)}$, where $CI_A$ denotes the radio cell A and $CI_{abcover}$ denotes an abnormal handover radio cell.

By taking the abnormal handover set {B, C, D} as an auxiliary analysis object, taking the distance $dis_{AB}$ between the radio cell A and the radio cell B as a reference, and in the range of the distance $dis_{AB}$ from the radio cell A, a set {C, D}$_{abnormal}$ of abnormal handover radio cells and a set {E} of other radio cells exist, the radio cell E is from a reference table of deployment of base stations, and the radio cell E is selected as a radio cell (auxiliary analysis object) peripheral to the radio cell A according to locations of radio cells in the reference table.

At step S403, since there is a radio cell $CI_E$ in the set {C, D, E} of radio cells, so that the angle $\alpha_{<EAB}$ formed by the radio cells E, A, B with the radio cell A as the vertex satisfies $\alpha_{<EAB} <= \theta_{stan}$ ($\theta_{stan}$ is a preset angle), it is determined that there is an intermediate radio cell $CI_E$ in the handover path between the radio cell $CI_B$ and the radio cell $CI_A$, and thus it is determined that the radio cell $CI_A$ is an abnormally covered radio cell, because, under normal conditions, when the voice call is handed over from the radio cell B to the radio cell A, the intermediate radio cell E should be used as the middle bridge but not be skipped over, and since the radio cell A is a high frequency abnormal handover radio cell, it is determined that the radio cell A is an abnormally covered radio cell.

In the example, $\theta_{stan}$ is the preset angle, and may be 15°, that is, when $\alpha_{<EAB}$ is not greater than 15°, the included angle, which is formed by the connection path from the radio cell E to the radio cell A and the handover path from the radio cell B to the radio cell A, smaller than or equal to the preset angle.

At step S404, the above steps S402 and S403 are repeated for determination with reference to the distance $dis_{AC}$ between the radio cell A and the radio cell C and the distance dis between the radio cell A and the radio cell D, and if the radio cells B, C and D in the set {B, C, D} of abnormal handover radio cells are all used for the determination, and no intermediate radio cell exists for an abnormal handover path between radio cell A and radio cell B, an abnormal handover path between radio cell A and radio cell C, or an abnormal handover path between radio cell A and radio cell D, to make the included angle, which is formed by the connection path from the intermediate radio cell to the radio cell (radio cell A) in which the voice call is located after the radio cell handover and the abnormal handover path, smaller than or equal to the preset angle $\theta_{stan}$, the radio cell A cannot be positioned as an abnormally covered radio cell, and if the intermediate radio cell exists to make the included angle, which is formed by the connection path from the intermediate radio cell to the radio cell (radio cell A) in which the voice call is located after the radio cell handover and at least one abnormal handover path, smaller than or equal to the preset angle $\theta_{stan}$, the radio cell A can be positioned as an abnormally covered radio cell.

In some implementations, detailed information of the abnormally covered radio cell in the whole network, including key information such as a manufacturer of a base station, times related to the abnormal radio cell handover, location information (longitude and latitude) of the base station and an azimuth angle, may be output and displayed, so that maintenance personnel can further perform maintenance and processing conveniently, the maintenance efficiency of the radio cell is improved, and the maintenance cost is reduced.

The procedure of determining the abnormal coverage of the radio cell is further described below by way of a specific example.

Figure 6:
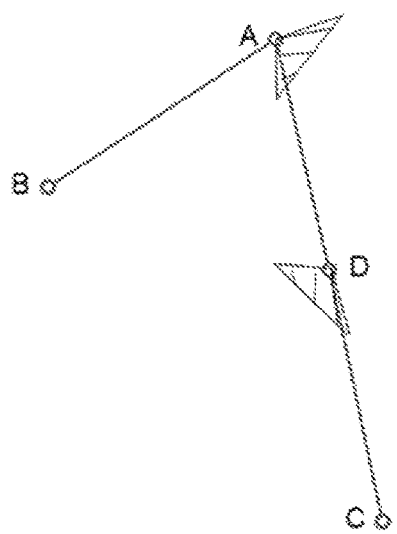
FIG. 6 is a schematic diagram of determining an abnormal coverage of a radio cell by using a method for positioning an abnormal coverage of a radio cell according to an embodiment of the present disclosure.

Referring to FIG. 6, for example, it is analyzed whether or not radio cell A with number 446000061639426 is an abnormally covered radio cell. First, signaling data collected from the Sgi interface and the S1 interface is read, and then, the following steps 1 to 3 are performed.

Step 1, taking the international mobile subscriber identity IMSI and the 5-second time slice parameter as an association key to associate the S1 interface signaling data with the Sgi interface signaling data, and continuously calculating the voice quality MOSs of each voice call before and after the radio cell handover. In the example, the radio Cell ID is denoted as CI (i.e., Cell ID). Here, three key data recordings (XDRs) are listed, each key data recording includes an ID (XDRID) of the key data recording, an ID (CI) of the radio cell in which the voice call is located before the radio cell handover is performed, the voice quality MOS of the voice call before the radio cell handover, an ID (CI) of the radio cell in which the voice call is located after the radio cell handover is performed, and the voice quality MOS of the voice call after the radio cell handover.

The first key data recording includes: XDRID, 8673416335222351312; CI, 446000061666822 before the radio cell handover; the voice quality MOS 4.1 of the voice call before the radio cell handover; CI, 446000061639426 after the radio cell handover; and the voice quality MOS 2.5 of the voice call after the radio cell handover.

The second key data recording includes: XDRID, 8358155320407783023; CI, 446000061647616 before the radio cell handover; the voice quality MOS 3.7 of the voice call before the radio cell handover; CI, 446000061639426 after the radio cell handover; and the voice quality MOS 3.7 of the voice call after the radio cell handover.

The third key data recording includes: XDRID, 5502698407322978765; CI, 446000065256960 before the radio cell handover; the voice quality MOS 3.9 of the voice call before the radio cell handover; CI, 446000061639426 after the radio cell handover; and the voice quality MOS 3.8 of the voice call after the radio cell handover.

In FIG. 6, A, B, C, D represent different radio cells respectively, for example, A represents XXXX-ZLH-1 in city XX, B represents XX-ZLH-2 in city XX, C represents XX-ZLH-3 in city XX, and D represents XXX-ZLH-3 in city XX.

The radio cells passed by each voice call are listed, and a window with a length of 2 is used, for example, different radio cells exist in the window, that is, the radio cell handover is carried out during a procedure of the voice call.

For the voice call subjected to the radio cell handover, the difference value of the voice quality MOSs of the voice call before and after the radio cell handover is calculated, and in response to that the difference value exceeds a preset threshold value, the radio cell handover is determined to be abnormal. The window with the length of 2 is used in this example to focus on the radio cell handover that the voice call is directly handed over between two radio cells without aiding of a middle bridge.

Step 2, determining a high frequency abnormal handover radio cell, and in this example, the radio cell (radio cell A) having the CI of 446000061639426 is associated with 75 times of abnormal radio cell handover, and thus the radio cell is the high frequency abnormal handover radio cell and used as an abnormal coverage analysis object.

Step 3, selecting radio cells peripheral to the high frequency abnormal handover radio cell as auxiliary analysis objects, and according to the order of the handover paths from long to short, determining whether an intermediate radio cell exists to make the included angle, which is formed by the connection path from the intermediate radio cell to the high frequency abnormal handover radio cell and any handover path from the radio cell in which the voice call is located before the radio cell handover to the high frequency abnormal handover radio cell, smaller than or equal to 15 degrees of the preset fixed angle. As shown in FIG. 6, in this example, there is an intermediate radio cell D, and the included angle, which is formed by the connection path from the radio cell D to the radio cell A and the handover path from the radio cell C to the radio cell A, smaller than or equal to 15 degrees, that is, the intermediate radio cell D between the radio cell C and the radio cell A may be used as the middle bridge, but the voice call is handed over directly from the radio cell C to the radio cell A and the intermediate radio cell D is skipped over, thus the radio cell A is positioned as the abnormally covered radio cell.

Figure 7:
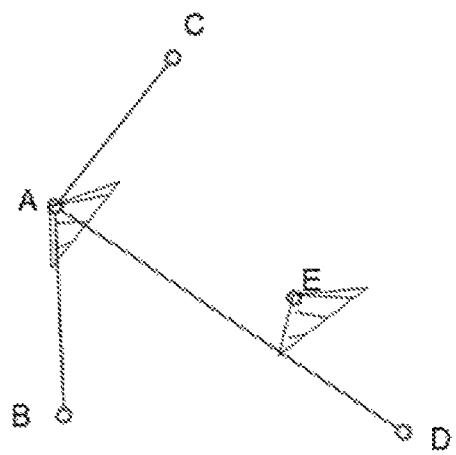
FIG. 7 is a schematic diagram of determining an abnormal coverage of a radio cell by using a method for positioning an abnormal coverage of a radio cell according to an embodiment of the present disclosure.

Referring to FIG. 7, for example, it is analyzed whether or not the radio cell A with the number 446000065249537 is an abnormally covered radio cell. First, signaling data collected from the Sgi interface and the S1 interface is read, and then, the following steps 1 to 3 are performed.

Step 1, taking the international mobile subscriber identity IMSI and the 5-second time slice parameter as an association key to associate the S1 interface signaling data with the Sgi interface signaling data, and continuously calculating the voice quality MOSs of each voice call before and after the radio cell handover. Here, three XDRs are listed, and each XDR includes an XDRID, a CI in which the voice call is located before the radio cell handover, a voice quality MOS of the voice call before the radio cell handover, a CI in which the voice call is located after the radio cell handover, and a voice quality MOS of the voice call after the radio cell handover.

The first XDR includes: XDRID, 1200539618076788603; CI, 446000061662722 before the radio cell handover; the voice quality MOS 3.8 of the voice call before the radio cell handover; CI, 446000065249537 after the radio cell handover; and the voice quality MOS 3.8 of the voice call after the radio cell handover.

The second XDR includes: XDRID, 586843131415270055; CI, 446000061666306 before the radio cell handover; the voice quality MOS 3.7 of the voice call before the radio cell handover; CI, 446000065249537 after the radio cell handover; and the voice quality MOS 1.9 of the voice call after the radio cell handover.

The third XDR includes: XDRID, 5216150490131828889; CI, 446000061629698 before the radio cell handover; the voice quality MOS 3.4 of the voice call before the radio cell handover; CI, 446000065249537 after the radio cell handover; and the voice quality MOS 3.2 of the voice call after the radio cell handover.

In FIG. 7, A, B, C, D, E represent different radio cells respectively, for example, A represents XXXXX-ZLH-2, B represents XXXX-ZLH-2, C represents XXXX-ZLH-3, D represents XXXXX-ZLH-5, and E represents XXX-ZLH-1.

The radio cells passed by each voice call are listed, and a window with the length of 2 is used, for example, different radio cells exist in the window, that is, the radio cell handover is carried out during a procedure of the voice call. For the voice call subjected to the radio cell handover, the difference value of the voice quality MOSs of the voice call before and after the radio cell handover are calculated, and in response to that the difference value exceeds a preset threshold value, the radio cell handover is determined to be abnormal.

Step 2, determining a high frequency abnormal handover radio cell, in this example, the radio cell (radio cell A) having the CI of 446000065249537 is related to 88 times of abnormal radio cell handover, thus the radio cell is determined as the high frequency abnormal handover radio cell and used as an abnormal coverage analysis object.

Step 3, selecting radio cells peripheral to the high frequency abnormal handover radio cell as auxiliary analysis objects, and according to the order of the handover paths from long to short, determining whether an intermediate radio cell exists to make the included angle, which is formed by the connection path from the intermediate radio cell to the high frequency abnormal handover radio cell and any handover path from the radio cell in which the voice call is located before the radio cell handover to the high frequency abnormal handover radio cell, smaller than or equal to 15 degrees of a preset fixed angle. As shown in FIG. 7, in this example, there is an intermediate radio cell E, and the included angle, which is formed by the connection path from the radio cell E to the radio cell A and the handover path from the radio cell D to the radio cell A, smaller than or equal to 15 degrees, that is, the intermediate radio cell E between the radio cell D and the radio cell A can be used as the middle bridge, but the voice call is handed over directly from the radio cell D to the radio cell A, and the intermediate radio cell E is skipped over, thus the radio cell A is positioned as an abnormally covered radio cell.

In the present disclosure, by analyzing the signaling of the core network part collected by the S1 interface probe and the Sgi interface probe, and using the high frequency abnormal handover radio cell as an analysis object, the radio cells peripheral to the high frequency abnormal handover radio cell are used as auxiliary analysis objects, and according to the order of the handover paths from long to short, it is determined whether the intermediate radio cell exists to make the included angle, which is formed by the connection path from the intermediate radio cell to high frequency abnormal handover radio cell and the handover path from the radio cell in which the voice call is located before the radio cell handover to the high frequency abnormal handover radio, smaller than or equal to a preset fixed angle $\theta$, in response to the intermediate radio cell exists, the high frequency abnormal handover radio cell is positioned as an abnormally covered radio cell, therefore, the abnormally covered radio cell in the whole network can be positioned, and problems, that it is difficult to monitor the abnormal coverage of the radio cell in the whole network, due to inconsistent equipment interface standards of radio equipment manufacturers, and the cost for positioning the abnormal coverage of the radio cell through manual road test is high are solved.

Figure 8:
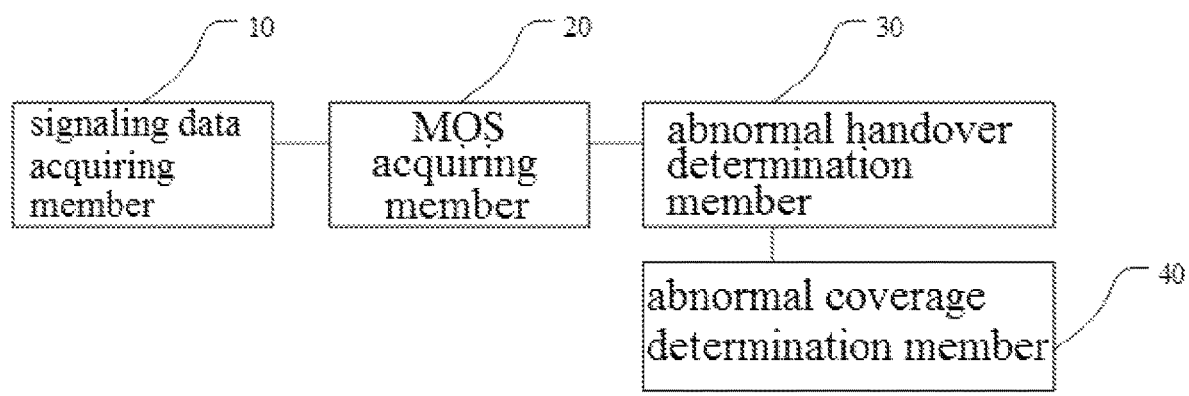
FIG. 8 is a block diagram of members of a device for positioning an abnormal coverage of a radio cell according to an embodiment of the present disclosure.

FIG. 8 is a block diagram of members of a device for positioning an abnormal coverage of a radio cell according to an embodiment of the present disclosure. As shown in FIG. 8, the device for positioning the abnormal coverage of the radio cell includes: a signaling data acquiring member 10 configured to acquire call flow signaling data and call handoff flow signaling data of a voice call; a voice quality MOS acquiring member 20 configured to associate the call flow signaling data with the call handoff flow signaling data, and acquire voice quality MOSs of the voice call before and after a radio cell handover; an abnormal radio cell handover determination member 30 configured to determine that the radio cell handover is abnormal in response to that a reduction amplitude of the voice quality MOS of the voice call after the radio cell handover with respect to the voice quality MOS of the voice call before the radio cell handover exceeds a preset threshold value; and an abnormal coverage determination member 40 configured to, in response to that the radio cell handover being abnormal is determined, and an intermediate radio cell exists to make an included angle, which is formed by the connection path from the intermediate radio cell to a radio cell in which the voice call is located after the radio cell handover and a handover path from a radio cell in which the voice call is located before the radio cell handover to the radio cell in which the voice call is located after the radio cell handover, smaller than or equal to a preset angle, position the radio cell in which the voice call is located after the radio cell handover as an abnormally covered radio cell.

In some implementations, the signaling data acquiring member 10 includes: a first acquiring element configured to acquire (by Sgi probe) the call flow signaling data collected between the serving gateway and the session border controller; and a second acquiring element configured to acquire the call handoff flow signaling data collected by the S1 probe between the base station and the mobile management entity of the core network part.

In some implementations, the abnormal coverage determination member 40 is configured to: within a preset duration, when the number of times of the abnormal radio cell handover occurring exceeds a preset threshold value when voice calls are handed over to a same radio cell, according to handover paths, in response to that the intermediate radio cell exists to make the included angle, which is formed by the connection path from the intermediate radio cell to the radio cell in which the voice calls are located after the radio cell handovers and any handover path from the radio cell in which the voice calls are located before the radio cell handover to the radio cell in which the voice calls are located after the radio cell handovers, smaller than or equal to the preset angle, position the radio cell in which the voice calls are located after the radio cell handovers as an abnormally covered radio cell.

In some implementations, the abnormal coverage determination member 40 includes: a high frequency abnormal radio cell handover determination element configured to determine that the radio cell in which the voice calls are located after the radio cell handovers are performed is the high frequency abnormal handover radio cell in response to that the number of times of the abnormal radio cell handover occurring exceeds the preset threshold value when the voice calls are handed over to the same radio cell within the preset duration; a handover path length acquiring element configured to acquire a length of a handover path from each radio cell from which the voice call is abnormally handed over to the high frequency abnormal handover radio cell within the preset duration; a detection element configured to, in order of the handover paths from long to short, detect whether there is an intermediate radio cell to make the included angle, which is formed by the connection path from the intermediate radio cell to the high frequency abnormal handover radio cell and any handover path from the radio cell in which the voice call is located before the radio cell handover to the high frequency abnormal handover radio cell, smaller than or equal to the preset angle; and a positioning element configured to position the high frequency abnormal handover radio cell as an abnormally covered radio cell in response to that the intermediate radio cell exists.

In some implementations, the device for positioning the abnormal coverage of the radio cell further includes: a display member configured to uniformly display the radio cells determined to be abnormally covered, and the information to be displayed includes at least one of a radio cell identifier, a base station equipment model, times related to the abnormal radio cell handover, location information (longitude and latitude) of the base station and an azimuth angle.

In some implementations of the method and the device for positioning the abnormal coverage of the radio cell according to embodiments of the present disclosure, an azimuth angle of the radio cell may be further referred to determine whether the intermediate radio cell that can be used as the middle bridge exists between the radio cell in which the voice call is located before the radio cell handover is performed and the radio cell in which the voice call is located after the radio cell handover is performed, so as to determine whether the radio cell in which the voice call is located after the radio cell handover is performed is an abnormally covered radio cell.

As a mode, it may be determined whether or not an intermediate radio cell (that can be used as the middle bridge) exists within a range covered by an azimuth angle of the radio cell in which the voice call is located after the radio cell handover is performed, to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, and in response to that the intermediate radio cell exists within the range covered by the azimuth angle of the radio cell in which the voice call is located after the radio cell handover, the radio cell in which the voice call is located after the radio cell handover is positioned as an abnormally covered radio cell.

As an alternative mode, it may be determined whether or not there is an intermediate radio cell (that can be used as the middle bridge) to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, and the azimuth angle of the intermediate radio cell covers the radio cell in which the voice call is located before the radio cell handover, and in response to that there is the intermediate radio cell, and the azimuth angle of the intermediate radio cell covers the radio cell in which the voice call is located before the radio cell handover is performed, the radio cell in which the voice call is located after the radio cell handover is positioned as an abnormally covered radio cell.

In addition, the above two modes may be combined, that is, it may be determined whether or not there is an intermediate radio cell (that can be used as the middle bridge) within a range covered by an azimuth angle of the radio cell in which the voice call is located after the radio cell handover is performed, to make the included angle, which is formed by the connection path from the intermediate radio cell to the radio cell in which the voice call is located after the radio cell handover and the handover path from the radio cell in which the voice call is located before the radio cell handover to the radio cell in which the voice call is located after the radio cell handover, smaller than or equal to the preset angle, and the azimuth angle of the intermediate radio cell covers the radio cell in which the voice call is located before the radio cell handover, and in response to that there is the intermediate radio cell within the range covered by the azimuth angle of the radio cell in which the voice call is located after the radio cell handover, and the azimuth angle of the intermediate radio cell covers the radio cell in which the voice call is located before the radio cell handover, the radio cell in which the voice call is located after the radio cell handover is positioned as an abnormally covered radio cell.

By determining whether the intermediate radio cell, which can be used as the middle bridge, exists between the radio cell in which the voice call is located before the radio cell handover is performed and the radio cell in which the voice call is located after the radio cell handover is performed, by referring to the azimuth angle of the radio cell, whether the radio cell in which the voice call is located after the radio cell handover is performed being an abnormally covered radio cell can be more accurately determined.

The "azimuth angle" of the radio cell mentioned in the present disclosure is related to the antenna orientation of the base station of the radio cell, and specifically, for example, a horizontal angle through which a north-pointing direction line of the base station rotates to an orientation of antenna of the base station in the clockwise direction may be regarded as the azimuth angle of the radio cell.

The "member", "element" referred to in the present disclosure may be implemented by hardware, for example, a central processing unit (CPU), an integrated circuit (IC), or the like, or may be implemented by a combination of software and hardware.

An embodiments of the present disclosure further provides a non-volatile computer-readable storage medium storing computer-executable instructions, which, when executed by a processor, cause the processor to perform the method for positioning the abnormal coverage of the radio cell in the embodiment of the present disclosure.

An embodiment of the present disclosure further provides a computer device, and the computer device includes a memory, a processor, and a computer program stored on the memory and executable on the processor, and the processor executes the method for positioning the abnormal coverage of the radio cell provided by the embodiment of the present disclosure by executing the computer program.

It should be understood by those skilled in the art that all or a portion of the procedures in the method for positioning the abnormal coverage of the radio cell provided by the embodiment of the present disclosure may be implemented by hardware related to instructions of a computer program, and the computer program may be stored in one or more computer-readable storage media. As the present disclosure, the computer program may be stored in the storage medium of a computer system and executed by at least one process of the computer system to execute the procedures in the method for positioning the abnormal coverage of the radio cell provided by the embodiment of the present disclosure.

The storage medium may be a magnetic disk, an optical disk, a read-only memory (ROM), a random access memory (RAM), or the like.

The technical features of the embodiments of the present disclosure may be arbitrarily combined, and for the sake of brevity in the description, not all possible combinations of the technical features in the embodiments of the present disclosure are described, however, as long as there is no contradiction between the technical features, the combinations thereof should be considered to fall within the scope of the description of the present disclosure.

The present disclosure describes only some examples and implementations, but the present disclosure is not limited thereto, and the described examples and implementations are not to be construed as limiting the scope of the present disclosure. It should be noted that various changes and modifications can be made by those skilled in the art without departing from the concept of the present disclosure, and these changes and modifications fall within the scope of the present disclosure. The scope of the present disclosure should be determined by the appended claims.

The invention claimed is:

1. A method for positioning an abnormal coverage of a radio cell, comprising:
   acquiring call flow signaling data and call handoff flow signaling data of a voice call;
   associating the call flow signaling data with the call handoff flow signaling data and acquiring voice quality MOSs of the voice call before and after a radio cell handover;
   determining whether a reduction amplitude of the voice quality MOS of the voice call after the radio cell handover with respect to the voice quality MOS of the voice call before the radio cell handover exceeds a preset threshold value, and in response to that the reduction amplitude exceeds the preset threshold value, determining that the radio cell handover of the voice call is abnormal;
   in response to that the radio cell handover of the voice call is abnormal, determining whether an intermediate radio cell exists to make an included angle, which is formed by a connection path and a handover path, smaller than or equal to a preset angle, wherein the connection path is a path from the intermediate radio cell to a first radio cell, the handover path is a path from a second radio cell to the first radio cell, the first radio cell is a radio cell in which the voice call is located after the radio cell handover, and the second radio cell is a radio cell in which the voice call is located before the radio cell handover; and
   in response to that the intermediate radio cell exists, determining that the radio cell handover of the voice call is performed by skipping the intermediate radio cell, and positioning the first radio cell as an abnormally covered radio cell;
   wherein in response to that the radio cell handover of the voice call is abnormal, determining whether the intermediate radio call exists comprising:
   within a present duration, in response to that a member of times of abnormal radio cell handover occurring exceeds a preset threshold value when voice cells are handed over to a same first radio cell, positioning the first radio as a high frequency abnormal handover radio cell;

acquiring lengths of handover paths from the second radio cells from which the voice calls are abnormally handed over to the high frequency abnormal handover radio cell;

according to an order of the handover paths from the long to short, detecting whether the intermediate radio cells exists to make the included angle, which is formed by the connection path and any handover path, smaller than or equal to the present angle; and in response to that the intermediate radio cell exists, positioning the high frequency abnormal handover radio cell as the abnormally covered radio cell.

2. The method of claim 1, wherein acquiring call flow signaling data and call handoff flow signaling data of a voice call comprises:

acquiring the call flow signaling data collected between a service gateway and a session border controller; and acquiring the call handoff flow signaling data collected between a base station and a mobile management entity.

3. The method of claim 1, further comprising:

uniformly displaying radio cells positioned as the abnormally covered radio cell, and an information to be displayed comprises at least one of a radio cell identifier, a base station equipment model, times related to abnormal radio cell handover, location information of the base station and an azimuth angle.

4. The method of claim 1, wherein, in response to that the radio cell handover of the voice call is abnormal, determining whether the intermediate radio cell exists within a range covered by an azimuth angle of the first radio cell to make the included angle, which is formed by the connection path and the handover path, smaller than or equal to the preset angle; and in response to that the intermediate radio cell exists within the range covered by the azimuth angle of the first radio cell, positioning the first radio cell as the abnormally covered radio cell.

5. The method of claim 1, wherein, in response to that the radio cell handover of the voice call is abnormal, determining whether the intermediate radio cell exists to make the included angle, which is formed by the connection path and the handover path, smaller than or equal to the preset angle, and an azimuth angle of the intermediate radio cell covers the second radio cell; and in response to that the intermediate radio cell exists to make the included angle, which is formed by the connection path and the handover path, smaller than or equal to the preset angle, and the azimuth angle of the intermediate radio cell covers the second radio cell, positioning the first radio cell as the abnormally covered radio cell.

6. A device for positioning an abnormal coverage of a radio cell, comprising:

a signaling data acquiring member configured to acquire call flow signaling data and call handoff flow signaling data of a voice call;

a voice quality MOS acquiring member configured to associate the call flow signaling data with the call handoff flow signaling data and acquire voice quality MOSs of the voice call before and after a radio cell handover;

an abnormal radio cell handover determination member configured to determine whether a reduction amplitude of the voice quality MOS of the voice call after the radio cell handover with respect to the voice quality MOS of the voice call before the radio cell handover exceeds a preset threshold value, and in response to that the reduction amplitude exceeds the preset threshold value, determine that the radio cell handover of the voice call is abnormal; and an abnormal coverage determination member configured to, in response to that the radio cell handover of the voice call is abnormal, determine whether an intermediate radio cell exists to make an included angle, which is formed by a connection path and a handover path, smaller than or equal to a preset angle; and in response to that the intermediate radio cell exists, determine that the radio cell handover of the voice call is performed by skipping the intermediate radio cell and position a first radio cell as an abnormally covered radio cell, wherein the connection path is a path from the intermediate radio cell to the first radio cell, the handover path is a path from a second radio cell to the first radio cell, the first radio cell is a radio cell in which the voice call is located after the radio cell handover, and the second radio cell is a radio cell in which the voice call is located before the radio cell handover;

wherein the abnormal coverage determination member comprises;

a high frequency abnormal radio cell handover determination element configured to position the first radio call as a high frequency abnormal handover radio cell, in response to that a number of times of abnormal radio cell handover occurring exceeds a preset threshold value when the voice calls are handed over to the same first radio cell within a preset duration;

a handover path length acquiring element configured to acquire lengths of handover paths from the second radio cells from which the voice calls are abnormally handed over to the high frequency abnormal handover radio cell;

a detection element configured to, according to an order of the handover paths from long to short, detect whether the intermediate radio cell exists to make the included angle, which is formed by the connection path and any handover path, smaller than or equal to the preset angle, and a positioning element configured to position the high frequency abnormal handover radio cell as the abnormally covered radio cell, in response to that the intermediate radio cell exists.

7. The device of claim 6, wherein the signaling data acquiring member comprises:

a first acquiring element configured to acquire call flow signaling data collected between a serving gateway and a session border controller; and a second acquiring element configured to acquire call handoff flow signaling data collected between a base station and a mobility management entity.

8. The device of claim 6, further comprising:

a display member configured to uniformly display radio cells positioned as the abnormally covered radio cell, and an information to be displayed comprises at least one of a radio cell identifier, a base station equipment model, times related to abnormal radio cell handover, location information of the base station and an azimuth angle.

9. The device of claim 6, wherein the abnormal coverage determination member is configured to, in response to that the radio cell handover of the voice call is abnormal, determine whether the intermediate radio cell exists within a range covered by an azimuth angle of the first radio cell to make the included angle, which is formed by the connection path and the handover path, smaller than or equal to the preset angle, and in response to that the intermediate radio cell exists within the range covered by the azimuth angle of the first radio cell, position the first radio cell as the abnormally covered radio cell.

10. The device of claim 6, wherein the abnormal coverage determination member is configured to, in response to that the radio cell handover of the voice call is abnormal, determine whether the intermediate radio cell exists to make the included angle, which is formed by the connection path and the handover path, smaller than or equal to the preset angle, and an azimuth angle of the intermediate radio cell covers the second radio cell, and in response to that the intermediate radio cell exists to make the included angle, which is formed by the connection path and the handover path, smaller than or equal to the preset angle, and the azimuth angle of the intermediate radio cell covers the second radio cell, position the first radio cell as the abnormally covered radio cell.

11. A non-volatile computer-readable storage medium storing computer-executable instructions which, when executed by a processor, cause the processor to perform the method according to claim 1.

12. A computer device, comprising a memory, a processor and a computer program stored on the memory and executable on the processor, the processor executes the method according to claim 1 by executing the computer program.

* * * * *